United States Patent [19]

Janssen

[11] 4,388,499

[45] Jun. 14, 1983

[54] LINE INTERRUPTION CIRCUIT FOR USE IN A TELEPHONE SET

[75] Inventor: Daniël J. G. Janssen, Eindhoven, Netherlands

[73] Assignee: U.S. Philips Corporation, New York, N.Y.

[21] Appl. No.: 234,086

[22] Filed: Feb. 13, 1981

[30] Foreign Application Priority Data

Feb. 26, 1980 [NL] Netherlands .................. 8001136

[51] Int. Cl.³ ............................................ H04M 1/44
[52] U.S. Cl. ............................... 179/81 R; 179/90 K
[58] Field of Search ............. 179/81 R, 90 R, 16 EC, 179/90 K, 84 R

[56] References Cited

U.S. PATENT DOCUMENTS

| 4,079,211 | 3/1978 | Janssen | 179/81 R |
| 4,167,654 | 9/1979 | Bolus et al. | 179/81 R |
| 4,329,546 | 5/1982 | Montessi et al. | 179/81 R |

Primary Examiner—G. Z. Rubinson
Assistant Examiner—W. J. Brady
Attorney, Agent, or Firm—Thomas A. Briody; William J. Streeter; Laurence A. Wright

[57] ABSTRACT

A circuit comprising a line interruption arrangement for producing dial pulses, comprising a series arrangement of a semiconductor switching element and a control device connected between a first and a second line terminal, the first and second terminals being provided to enable connection to a subscriber's line. To limit the current in the subscriber's line while using a minimum of components, the control circuit comprises a current detection device which is connected to the control electrode of the semiconductor switching element to drive the semiconductor switching element into saturation when the line current is below a predetermined value and to drive the semiconductor switching element out of saturation when the line current is above the said predetermined value.

5 Claims, 1 Drawing Figure

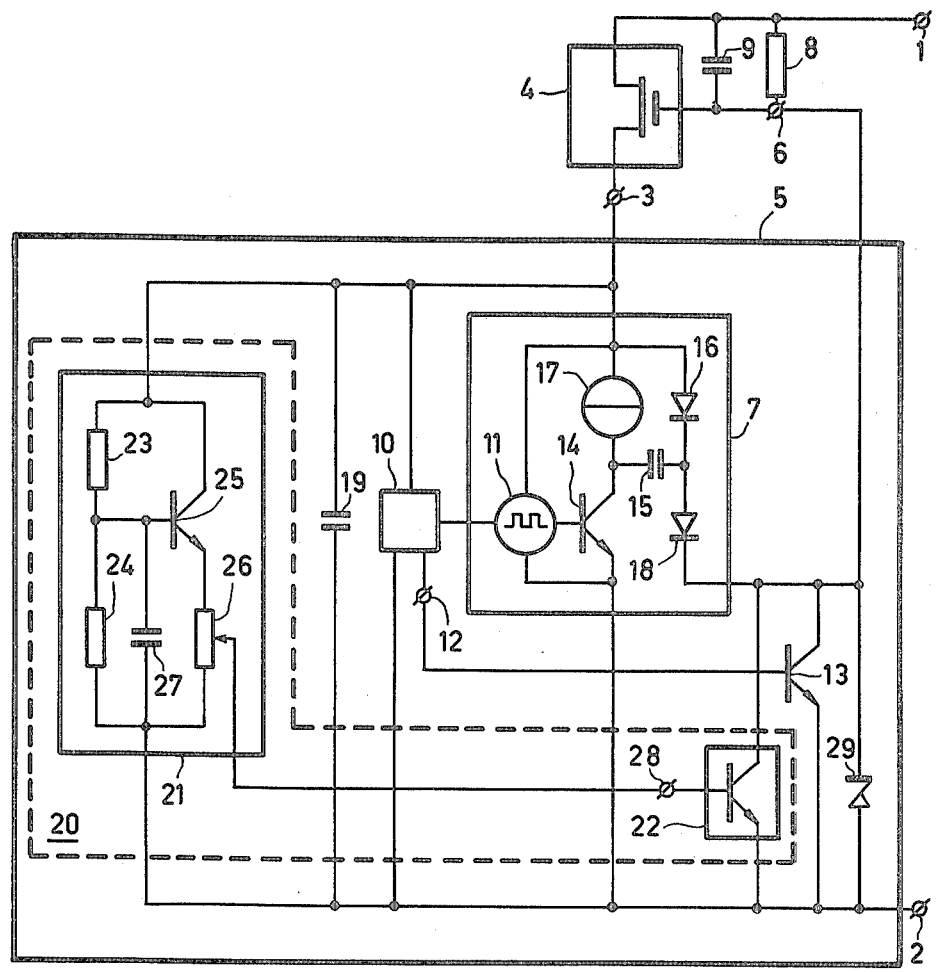

LINE INTERRUPTION CIRCUIT FOR USE IN A TELEPHONE SET

The invention relates to a circuit for use in a telephone set the circuit comprising a line interruption arrangement for producing electronically generated dial pulses having a semiconductor switching element connected between a first terminal and a connecting point and a control circuit connected between the connecting point and a second terminal, a control electrode of the semiconductor switching element being coupled to the control device for rendering the semiconductor element non-conductive during the presence of each control pulse produced by the control circuit and for rendering the semiconductor switching element conductive in the absence of a control pulse.

BACKGROUND OF THE INVENTION

Such a circuit is disclosed in United Kingdom Patent Specification No. 1,404,078 and is extensively described in Applicants Netherlands Patent Application No. 8001136 having the same priority date.

Modern telephone sets have a large number of electronic circuits. In addition to the above-mentioned electronic line interruption arrangement for generating dial pulses sets of this type may inter alia also comprise an automatic current limiter device and a protection against surge voltage peaks on the subscriber's line.

OBJECT OF THE INVENTION

It is an object of the invention to implement the circuit described in the opening paragraph in such a way that the semiconductor switching element is not only used to produce dial pulses but also as the current limiter element.

SUMMARY OF THE INVENTION

According to the invention, the circuit described in the opening paragraph is therefore characterized in that the control circuit comprises a current detection device for driving the semiconductor switching element into saturation during the absence of a dial pulse when the line current is below a predetermined value and for driving the semiconductor switching element out of saturation when the line current is above the said predetermined value.

A further reduction of the number of components is achieved when the current detection device comprises a voltage stabilising circuit and a threshold device connected thereto. This arrangement has the advantage that the major portion of the current detection device fulfills the function of voltage stabilising device without the need for additional elements.

BRIEF DESCRIPTION OF THE DRAWING

The invention and its advantages will now be further explained by way of example with reference to the embodiment shown in the accompanying FIGURE.

DETAILED DESCRIPTION OF THE PREFERRED EMBODIMENT

The circuit for use in a telephone set shown in the FIGURE comprises a line interruption arrangement having a semiconductor switching element 4, which is connected between a first terminal 1 and a connecting point 3 and a control circuit 5 connected between the connecting point 3 and terminal 2. The output of the control circuit 5 is connected to the control electrode 6 of the semiconductor switching element 4, this control electrode being connected to the first terminal 1 by way of the parallel arrangement of a resistor 8 and a capacitor 9.

This circuit is connected to a subscriber's line via a hook contact, not shown, and optionally, via a bridge circuit. The further circuits of a telephone set such as the microphone and the telephone circuits are connected between the connecting point 3 and terminal 2. For the transmission of dial pulses, the control circuit 5 comprises a pulse generator 10, which at its output 12 produces control pulses from clock pulses obtained from clock pulse generator 11, the number of these control pulses corresponding with a digit which was chosen by means of push-buttons or a dial. These control pulses are applied to the base of a transistor 13 the main current path of which is connected between the control electrode 6 and terminal 2.

During the pulse duration of a control pulse applied to the base of transistor 13, this transistor is conductive and the control electrode 6 of the semiconductor switching element 4 is connected to the terminal 2. The switching element 4 is then in its non-conductive state and the subscriber's loop is open. The supply voltage of the control circuit is maintained by capacitor 19 for the period of time the subscriber's loop is open. When no control pulse is applied to the base of transistor 13 this transistor 13 is cut-off. Since the control electrode 6 is connected to terminal 1 via resistor 8 the switching element 4 is conductive. The subscriber's loop is then closed.

For very long subscriber's lines the voltage between the terminals 1 and 2 is at a minimum. This results in the value of the supply voltage across the control circuit 5 becoming so low because of the voltage drop across the switching element 4 that the proper operation of this control circuit 5 and the remaining electronic circuits, connected in parallel thereto, of a telephone set is endangered. To obviate this the control circuit 5 includes a switched-mode amplifier 7 which produces an output sufficient to saturate the switching element 4. Transistor 14 is alternatively driven to its conducting and non-conducting state under the control of the clock pulse generator 11. When transistor 14 is conductive, capacitor 15 is charged via diode 16 up to a voltage difference between connecting point 3 and the second terminal 2, reduced by the voltage drop across the diode 16 and the conducting transistor 14. When transistor 14 is non-conducting, then the voltage of the connecting point 3 is applied via current source 17 to that side of the capacitor 15, which is connected to the current source 17. The voltage at the side connected to the diode 16 is then increased, causing the diode 16 to be cut-off and the diode 18 to become conductive. This high output voltage is applied to the control electrode 6 of the semiconductor switching element 4. The switched-mode amplifier 7 is rated such that the voltage at the control electrode is at least equal to the voltage at terminal 1. In this manner it is achieved that the semiconductor switching element is in its saturated state in the case of very long subscriber's lines, causing the supply voltage across the control circuit 5 to be substantially equal to the voltage between the line terminals 1 and 2.

It should be noted that for the period of time transistor 14 is conductive the control voltage at electrode 6 is maintained by means of capacitor 9.

A normal bipolar transistor may be used as the switching element 4. The use of a V-MOS transistor as the semiconductor switching element has the advantage that little energy is required for the control, so that a very rapid change-over from the non-conductive to the conductive state of the saturated semiconductor switching element is possible.

For short subscriber's lines the energy available between the terminals 1 and 2 is higher than required for a proper operation of the control circuit 5 and the further circuits connected in parallel therewith, so that an unnecessarily high line current will flow with all drawbacks this entails, such as an excessive dissipation.

To obviate this drawback the control circuit 5 comprises a current detection device 20. In this embodiment this device is constructed as a voltage stabilising circuit 21 having a threshold device 22 connected thereto. Instead of a voltage stabiliser 21 it is alternatively possible to use, for example, a voltage divider.

The operation of this voltage stabiliser which is known from applicants Netherlands Patent Application (No. 7307296) is as follows:

The partial voltage which is produced by the voltage dividers 23 and 24 from the voltage between the connecting point 3 and the terminal 2 is applied to the base of a first transistor 25, the main current path of which is also connected in series with a resistor 26 between the connecting point 3 and the second terminal.

The base of the transistor 25 is short-circuited for alternating current to the terminal 2 via capacitor 27.

When the voltage between the terminals 1 and 2 increases slowly, the voltage at the base of transistor 25 will increase and this transistor will become more conductive, and the line current increases. In response to this current increase the voltage drop across the subscriber's line increases and the voltage between the terminals decreases. Likewise, a decrease in the voltage difference between the terminals 1 and 2 is counteracted by the voltage stabilisation circuit 21.

In order to prevent, however, very large line currents for very short subscriber's lines, the input terminal 28 of the threshold device 22 is connected to the emitter resistor of transistor 25. In this embodiment the threshold device is formed by one single transistor, whose main current path is connected between the control electrode 6 of the semiconductor switching element 4 and the second terminal 2, its base being connected to the input terminal 28. However, other threshold devices may alternatively be used.

The circuit operates as follows. In the case of a short subscriber's line the line current is so large that the voltage drop across resistor 26 exceeds the base-emitter voltage of transistor 22. This transistor is then in the conductive state and withdraws current from the control electrode 6 of the semiconductor switching element 4. Consequently the latter is no longer in its saturated state and a voltage drop is produced across the switching element. This voltage drop ensures that the voltage between the connecting point 3 and the terminal 2 is decreased and that, consequently, the current is limited. For a still shorter subscriber's line the voltage drop across the resistor 26 is still larger, causing transistor 22 to become conductive to a still greater extent. Then the semiconductor switching element receives still less control current which causes the voltage drop across the element 4 to increase and, consequently, the line current to decrease. With a proper rating it is possible to limit the line current to, for example, 45 mA.

Apart from its function as an interrupter contact for dial pulses, the semiconductor switching element 4 also functions as a limiting element for the line current.

When the semiconductor switching element is formed by a V-MOS transistor it is advantageous to connect a zener diode 29 between the control electrode 6 and the second terminal 2. When a sudden voltage peak occurs which is higher than the normal maximum line voltage, this zener diode 29 will conduct and the voltage of the control electrode 6 will be limited to the zener voltage. The voltage at connecting point 3 is then limited to the zener voltage reduced by the control voltage of semiconductor element 11, as a result of which the control circuit, which may be implemented as an integrated circuit, is protected from high peak voltages. Almost the total peak voltage is then found across the semiconductor element 4. Since element 4 is a discrete element, it can easily be made to withstand the required voltage peaks.

It should be noted that capacitor 19, which maintains the supply voltage of the switched-mode amplifier 7 can be omitted when the supply terminal of this amplifier 7 which is connected to connecting point 3 is connected to the tapping point of the voltage divider 23, 24, in which situation the capacitor 27 then takes over the function of capacitor 19 as the supply source.

Furthermore, it is advantageous to switch the switched-mode amplifier 7 off when the semiconductor switching element 4 is driven out of saturation, to prevent unnecessary dissipation. This can be achieved, for example, by incorporating a further transistor in the control circuit the main current path of which is connected between the base of transistor 14 and terminal 2 and the base of which is connected to the emitter of transistor 25, which results in that the switched-mode amplifier 7 is switched-off before the threshold device 22 becomes active.

What is claimed is:

1. A line interruption circuit for use in a telephone set for producing electronically generated dial pulses comprising:

a semiconductor switching element connected between a first terminal and a connecting point, a control circuit connected between said connecting point and a second terminal, a control electrode of said semiconductor switching element being coupled to said control circuit for rendering said semiconductor element non-conductive during the presence of each control pulse produced by said control circuit and for rendering said semiconductor switching element conductive in the absence of a control pulse, said control circuit comprises a current detection device for driving said semiconductor switching element into saturation during the absence of a dial pulse when the line current is below a predetermined value and for driving said semiconductor switching element out of saturation when the line current is above the said predetermined value.

2. A circuit as claimed in claim 1, wherein said current detection device comprises a voltage stabilizing circuit and a threshold device connected thereto.

3. A circuit as claimed in claim 2, wherein said control electrode of said semiconductor switching element is connected to said first terminal via a resistor, and said stabilizing circuit comprises a series arrangement of a first transistor having an emitter resistor connected between said connecting point and said second terminal by means of said collector terminal of said first transistor, a voltage divider connected in parallel with said first transistor, the tapping point of said voltage divider connected to the base of said first transistor, a capacitor connected between the base of said first transistor and said second terminal, and said threshold device comprises a second transistor the main current path of which is connected between said control electrode of said semiconductor switching element and said second terminal and the base of said second transistor is connected to said emitter resistor of said first transistor.

4. A circuit as claimed in claim 3, wherein said semiconductor switching element is a V-MOS transistor.

5. A circuit as claimed in claim 4, comprising a zener diode connected between said control electrode of said semiconductor switching element and said second terminal.

* * * * *